(12) United States Patent
Chun

(10) Patent No.: US 7,494,308 B2
(45) Date of Patent: Feb. 24, 2009

(54) AIR TANK FIXING STRUCTURE FOR COMMERCIAL VEHICLES

(75) Inventor: Chong Chul Chun, Jeonbuk (KR)

(73) Assignee: Hyundai Motor Company, Seoul (KR)

( * ) Notice: Subject to any disclaimer, the term of this patent is extended or adjusted under 35 U.S.C. 154(b) by 260 days.

(21) Appl. No.: 11/298,646

(22) Filed: Dec. 8, 2005

(65) Prior Publication Data

US 2007/0098515 A1  May 3, 2007

(30) Foreign Application Priority Data

Nov. 1, 2005  (KR) ...................... 10-2005-0104030

(51) Int. Cl.
*B60P 7/12* (2006.01)
(52) U.S. Cl. ...................................................... 410/47
(58) Field of Classification Search .................. 410/31, 410/47, 49
See application file for complete search history.

(56) References Cited

U.S. PATENT DOCUMENTS

| | | | | |
|---|---|---|---|---|
| 3,019,916 A | * | 2/1962 | Malcher | 206/596 |
| 3,091,348 A | * | 5/1963 | Neuhauser | 206/391 |
| 3,430,981 A | * | 3/1969 | Tarantola | 410/44 |
| 3,476,260 A | * | 11/1969 | Jay | 206/503 |
| 4,175,666 A | * | 11/1979 | Smith | 211/85.18 |
| D256,346 S | * | 8/1980 | Annis | D34/38 |
| 4,431,107 A | * | 2/1984 | Bergstrom et al. | 211/59.4 |
| 4,488,649 A | * | 12/1984 | Mark | 211/49.1 |
| 4,506,796 A | * | 3/1985 | Thompson | 211/59.4 |
| 5,040,933 A | * | 8/1991 | Lee et al. | 410/42 |
| 5,123,547 A | * | 6/1992 | Koch | 211/59.4 |
| 5,735,412 A | * | 4/1998 | Sheckells | 211/59.4 |
| 5,984,119 A | * | 11/1999 | Uhl | 211/59.4 |
| 6,224,024 B1 | * | 5/2001 | Fritz | 248/55 |
| 6,637,607 B2 | * | 10/2003 | Tombu | 211/85.22 |
| 7,195,257 B2 | * | 3/2007 | Stoneback et al. | 280/79.6 |

FOREIGN PATENT DOCUMENTS

| | | |
|---|---|---|
| EP | 0 393 437 A1 | 10/1990 |
| JP | 60-259519 | 12/1985 |
| JP | 61-135817 | 6/1986 |
| JP | 63-074716 | 4/1988 |
| JP | 08-188031 | 7/1996 |
| JP | 11-105704 | 4/1999 |
| JP | 2000-118232 | 4/2000 |
| JP | 2001-018789 | 1/2001 |
| JP | 2004-291680 | 10/2004 |
| KR | P1999-0030632 | 5/1999 |
| KR | 10-2000-0013223 A | 3/2000 |
| KR | 10-2002-0057600 A | 7/2002 |

\* cited by examiner

*Primary Examiner*—H Gutman
(74) *Attorney, Agent, or Firm*—Edwards Angell Palmer & Dodge LLP; Peter F. Corless

(57) ABSTRACT

An air tank fixing structure is disclosed for vehicles capable of integrally fixing air tanks which are used for supplying air upon activation of a brake system or air suspension of the vehicle. In a specifically preferred system, the air tank fixing structure includes a first air tank fixing member fixed onto a body frame at one side thereof, and formed with at least one first fixing element in which at least one air tank for the vehicle is fixed at the other side; a second air tank fixing member formed with at least one second fixing element and placed on the air tank.

11 Claims, 2 Drawing Sheets

AIR TANK FIXING STRUCTURE FOR COMMERCIAL VEHICLES

CROSS-REFERENCE TO RELATED APPLICATION

This application claims priority to and the benefit of Korean Patent Application 10-2005-0104030 filed in the Korean Intellectual Property Office on Nov. 1, 2005, the entire content of which is incorporated herein by reference.

FIELD OF THE INVENTION

The present invention relates generally to an air tank fixing structure for commercial vehicles, and more particularly, to an air tank fixing structure for commercial vehicles capable of mounting air tanks, which are used for supplying hydraulic pressure for activating brake system and air suspension of the vehicle, to the vehicle in common.

BACKGROUND

A commercial vehicle like a truck has at least one air tank installed to its frame, such as a cross member, in order to supply air, wherein the air is required to activate a brake system for braking the vehicle or an air suspension for lessening down impact or vibration generated from a suspension system when a vehicle is in motion.

Especially, because a great braking force is required to slow a large-sized vehicle such as a truck, a great deal of air should be supplied at a time, and thus a plurality of air tanks are installed on the vehicle.

Conventionally, since the plurality of air tanks are distributed and installed at the several places on the vehicle, a fixing structure should be provided for each air tank. The air tank's position on the vehicle should not be changed by external influence, and thus the fixing structure should be firm. In this manner, because each of the air tanks distributed and installed on the vehicle should be firmly fixed, the vehicle incurs an increase in production cost and assembly process.

The information set forth in this Background of the Invention section is only for enhancement of understanding of the invention and should not be taken as an acknowledgement or any form of suggestion that this information forms the prior art that is already known to a person skilled in the art.

SUMMARY OF THE INVENTION

In one aspect, an air tank fixing structure is provided for vehicles capable of integrally fixing air tanks, which are suitably used for supplying air for activating a brake system and/or air suspension of the vehicle.

In a preferred aspect, an air tank fixing structure for a vehicle is provided which may include a first air tank fixing member fixed onto a body frame at one side thereof, and formed with at least one first fixing element in which at least one air tank for the commercial vehicle is fixed at the other side; and a second air tank fixing member formed with at least one second fixing element and fixed to the air tank.

In a preferred system, there is provided an air tank fixing structure for commercial vehicles. The air tank fixing structure preferably includes a first air tank fixing member fixed onto a body frame at one side thereof and fixed with at least one air tank for the vehicle at the other side, and a second air tank fixing member formed and installed on the air tank after the air tank is rested on the first air tank fixing member. The air tanks and the respective fixing members are fixed by a fastening bolt preferably of a U-shape so as to allow of maintenance of a rested state of the air tanks on the fixing members.

With the above-mentioned constituents, the air tanks are suitably integrally fixed at the same place of the frame of the vehicle without being distributed at many places of the commercial vehicle, such as a truck.

The invention also includes vehicles particularly commercial vehicles such as trucks and the like that comprise an air tank fixing structure as described herein.

It is understood that the term "vehicle" or "vehicular" or other similar terms as used herein is inclusive of motor vehicles in general such as passenger automobiles including sports utility vehicles (SUV), buses, trucks, various commercial vehicles, and the like. As discussed herein, for many aspects of the invention, preferred vehicles are commercial vehicles such as trucks and the like which may have air brakes or air suspension, or other vehicles that may have air brakes and/or air suspension systems Other aspects of the invention are discussed below.

BRIEF DESCRIPTION OF THE DRAWINGS

The above and other objectives, features and advantages of the present invention will be more apparent from the following detailed description taken in conjunction with the accompanying drawings, in which.

DETAILED DESCRIPTION OF THE INVENTION

Figure 1:
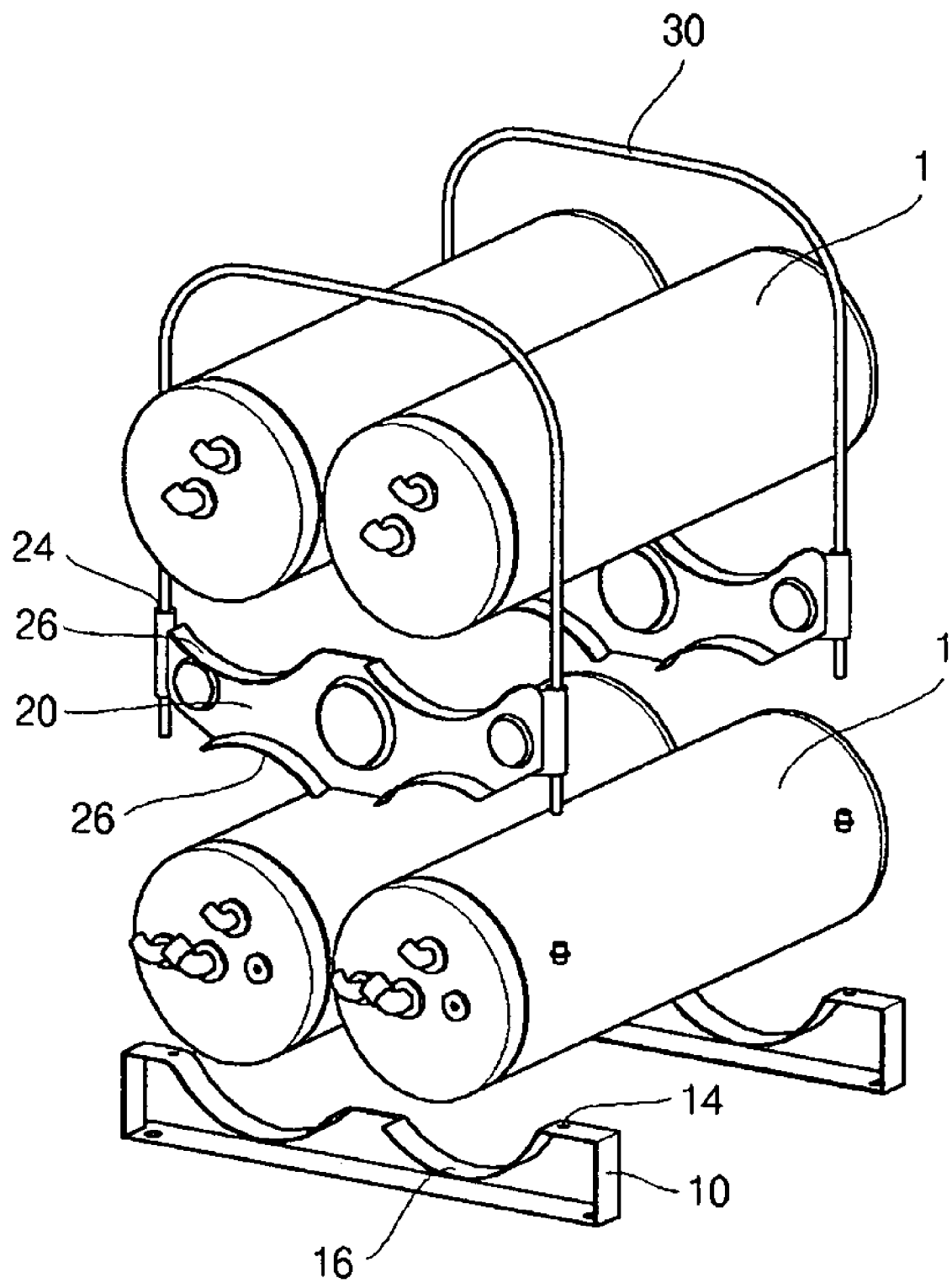
FIG. 1 is an exploded perspective view showing one embodiment of the air tank fixing structure for commercial vehicles according to the present invention.

As discussed above, in a preferred aspect, an air tank fixing structure for a vehicle is provided which may include a first air tank fixing member fixed onto a body frame at one side thereof, and formed with at least one first fixing element in which at least one air tank for the vehicle is fixed at the other side; and a second air tank fixing member formed with at least one second fixing element and fixed to the air tank. The air tank fixing structure suitably may further comprise a fastening element that can hold the air tank and the first and second air tank fixing members. Suitable fastening elements include e.g. bolt elements. Preferred first and second fixing elements may have a variety of configurations including recesses.

Exemplary embodiments of the present invention will be described with reference to the accompanying drawings. In the following description and drawings, the same reference numerals are used to designate the same or similar components, and so repetition of the description on the same or similar components will be omitted.

FIG. 1 is an exploded perspective view showing one embodiment of the air tank fixing structure for commercial vehicles according to the present invention. The embodiment of the present invention will be described below with reference to this drawing.

Firstly, a first air tank fixing bracket 10 is installed to the frame of a vehicle so as to enable both ends of at least one air tank to be located at a position where the air tank is fixed. The first air tank fixing bracket 10 preferably has a linear portion brought into contact with the frame, and at least one first fixing recess 16 fixing the air tank 1 on the side opposite to the linear portion. At this time, to increase the fixing force of the air tank 1, it is preferable that an outer surface of the air tank 1 has the same curvature as the first fixing recess 16.

After both ends of the air tank 1 is fixed to the first air tank fixing bracket 10, a second air tank fixing bracket 20 is disposed on the air tank 1.

The second air tank fixing bracket 20 is formed with second fixing recesses 26 on both sides thereof, wherein the air tank 1 is fixed in each of the second fixing recesses 26. Here, the second fixing recesses 26 of the second air tank fixing bracket 20 are preferably formed in axial symmetry.

Thus, after the second air tank fixing bracket 20 is disposed on the air tank 1 so as to allow the second fixing recess 26 formed on one side of the second air tank fixing bracket 20 to be engaged with an upper outer surface of the air tank 1, the air tank 1 is additionally suitably disposed in the second fixing recess 26 formed on the other side of the second air tank fixing bracket 20.

After the air tanks 1 are fixed using the first and second air tank fixing brackets 10 and 20, the first and second air tank fixing brackets 10 and 20 and the air tanks 1 are suitably fixed e.g. using fastening bolts 30. In preferred configurations, one or more of the fastening bolts 30 is formed in a U-shape. Thus, by this preferred configuration, both ends of each fastening bolt 30 pass through first and second bolt holes 14 and 24 which are formed on both ends of each of the first and second air tank fixing brackets 10 and 20, and then are fixed using nuts on the side of the first air tank fixing bracket 10.

As set forth above, for the air tanks 1 to be fixed by the fastening bolts 30, a width of each fastening bolt 30 should be preferably formed so as to be at least twice as large as the diameter of each air tank 1.

Further, it is preferable that each fastening bolt 30 is formed to have the same curvature as that of the outer surface of each air tank 1, and thereby firm fixation is achieved through close contact between the fastening bolts 30 and the air tanks 1.

Figure 2:
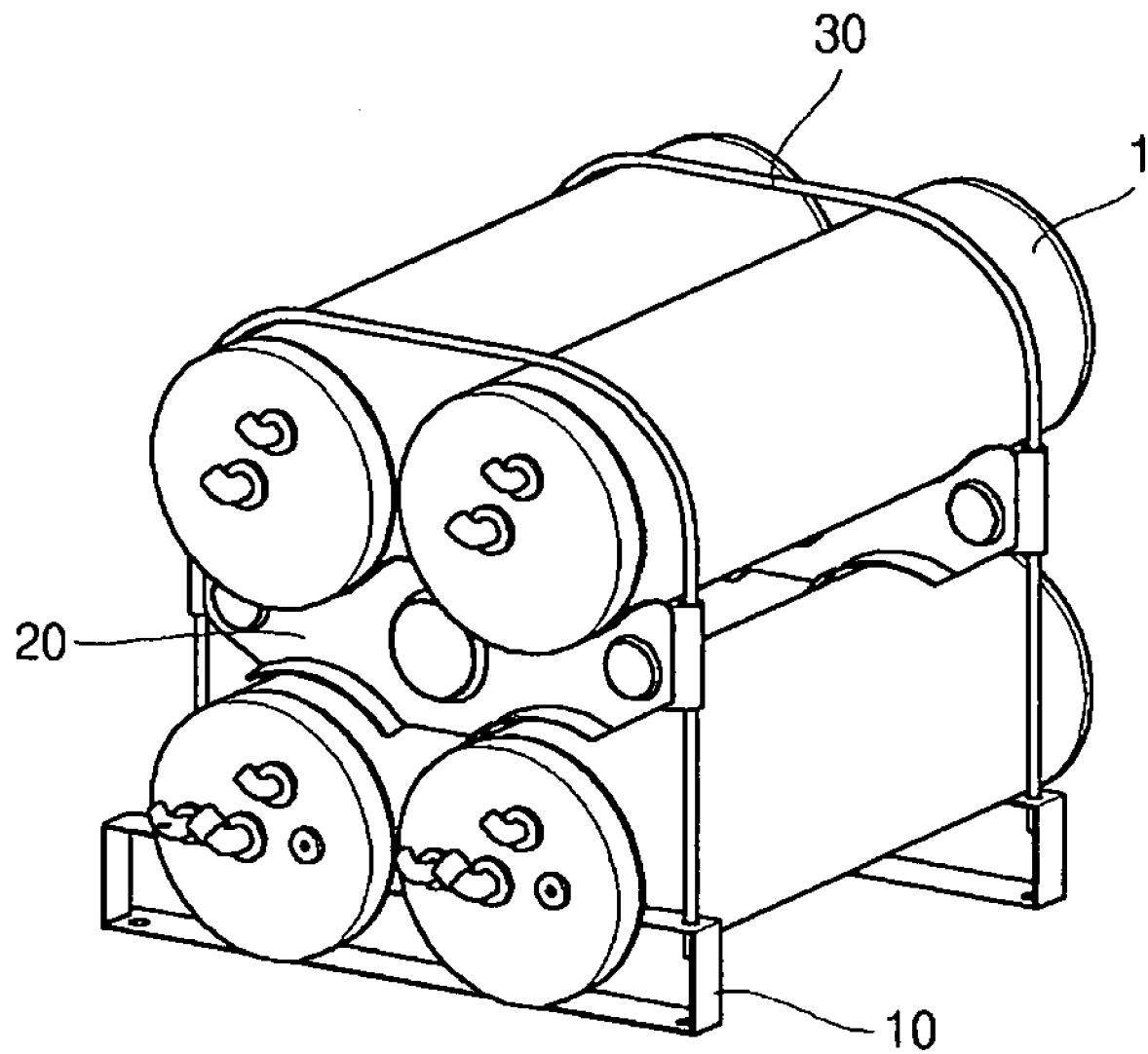
FIG. 2 is a perspective view showing an assembled state of one embodiment of the air tank fixing structure for commercial vehicles according to the present invention.

With the above-mentioned construction, the plurality of air tanks used in the commercial vehicle can be fixed to the same place, as shown in FIG. 2.

As can be seen from the foregoing description, the air tanks, which supply the air used to activate the air brake or air suspension of a vehicle, can be integrally fixed on one side of the vehicle.

Although exemplary embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. An air tank fixing structure for a vehicle, comprising:
   a first air tank fixing member for being fixed onto the vehicle at one side thereof, which is formed linearly and formed with at least one first fixing recess in which at least one air tank for the vehicle is fixed at the other side, wherein the first air tank fixing member is formed with bolt holes on both ends thereof;
   a second air tank fixing member formed linearly, formed with at least one second fixing recess on each side thereof, and placed on the air tank after the air tank is rested in the first fixing recess of the first air tank fixing member; and
   a fastening bolt formed in a U shape and holding the air tank and the first and second air tank fixing members.

2. The air tank fixing structure of claim 1, wherein the first fixing recess of the first air tank fixing member is formed so as to have the same curvature as that of an outer surface of the air tank.

3. The air tank fixing structure of claim 1, wherein the fastening bolt is inserted into the bolt holes of the first air tank fixing member through both ends thereof, respectively.

4. The air tank fixing structure of claim 1, wherein the second air tank fixing member is formed with the second fixing recesses on the both sides thereof, respectively.

5. An air tank fixing structure for a vehicle, comprising;
   a first air tank fixing member for being fixed onto the vehicle at one side thereof, which is formed linearly and formed with at least one first fixing recess in which at least one air tank for the vehicle is fixed at the other side;
   a second air tank fixing member formed linearly, formed with at least one second fixing recess on each side thereof, and placed on the air tank after the air tank is rested in the first fixing recess of the first air tank fixing member; and
   a fastening bolt formed in a U shape and holding the air tank and the first and second air tank fixing members
   wherein the second air tank fixing member is formed with the second fixing recesses on the both sides thereof, respectively, and the second fixing recesses are formed in axial symmetry.

6. The air tank fixing structure of claim 5, wherein the second fixing recesses are formed so as to have the same curvature as that of an outer surface of the air tank.

7. An air tank fixing structure for a vehicle, comprising:
   a first air tank fixing member for being fixed onto the vehicle at one side thereof, which is formed linearly and formed with at least one first fixing recess in which at least one air tank for the vehicle is fixed at the other side;
   a second air tank fixing member formed linearly, formed with at least one second fixing recess on each side thereof, and placed on the air tank after the air tank is rested in the first fixing recess of the first air tank fixing member; and
   a fastening bolt formed in a U shape and holding the air tank and the first and second air tank fixing members
   wherein the second air tank fixing member is formed (i) with the second fixing recesses on the both sides thereof, respectively, and (ii) with bolt holes on both ends thereof.

8. The air tank fixing structure of claim 7, wherein the fastening bolt is inserted into the bolt holes of the second air tank fixing member through both ends thereof, respectively.

9. An air tank fixing structure for a vehicle, comprising:
   a first air tank fixing member for being fixed onto the vehicle at one side thereof, which is formed linearly and formed with at least one first fixing recess in which at least one air tank for the vehicle is fixed at the other side;
   a second air tank fixing member formed linearly, formed with at least one second fixing recess on each side thereof, and placed on the air tank after the air tank is rested in the first fixing recess of the first air tank fixing member; and
   a fastening bolt formed in a U shape and holding the air tank and the first and second air tank fixing members
   wherein the second air tank fixing member is formed with the second fixing recesses on the both sides thereof, respectively, and
   wherein the fastening bolt has a width at least two times as great as the diameter of the air tank.

10. An air tank fixing structure for a vehicle, comprising:
    a first air tank fixing member for being fixed onto the vehicle at one side thereof, which is formed linearly and formed with at least one first fixing recess in which at least one air tank for the vehicle is fixed at the other side;

a second air tank fixing member formed linearly, formed with at least one second fixing recess on each side thereof, and placed on the air tank after the air tank is rested in the first fixing recess of the first air tank fixing member; and a fastening bolt formed in a U shape and holding the air tank and the first and second air tank fixing members wherein the second air tank fixing member is formed with the second fixing recesses on the both sides thereof, respectively, and the fastening element is a bolt.

11. The structure of claim 10 wherein the first and second fixing elements are recesses.

* * * * *